United States Patent [19]
Krebs

[11] 3,915,829
[45] Oct. 28, 1975

[54] ELECTROCHEMICAL STRUCTURE

[75] Inventor: William M. Krebs, Waltham, Mass.

[73] Assignee: Instrumentation Laboratory, Inc., Lexington, Mass.

[22] Filed: Oct. 10, 1972

[21] Appl. No.: 296,244

[52] U.S. Cl. .......................... 204/195 F; 204/195 G
[51] Int. Cl.² ........................................ G01N 27/40
[58] Field of Search ....... 204/195 R, 195 M, 195 G, 204/195 F, 195 P, 279

[56] References Cited
UNITED STATES PATENTS

| | | | |
|---|---|---|---|
| 2,934,484 | 4/1960 | Anderson | 204/195 F |
| 3,272,731 | 9/1966 | Hutchison et al. | 204/195 F |
| 3,334,039 | 8/1969 | Vlasak | 204/195 P |
| 3,398,079 | 8/1968 | Arthur et al. | 204/195 G |
| 3,438,886 | 4/1969 | Ross | 204/195 L |
| 3,445,365 | 5/1969 | Ross | 204/195 L |
| 3,498,289 | 3/1970 | Watanabe et al. | 204/195 F |
| 3,498,899 | 3/1970 | Kater et al. | 204/195 F |
| 3,505,196 | 4/1970 | Dahms | 204/195 F |
| 3,509,034 | 4/1970 | Paine | 204/195 P |
| 3,681,205 | 8/1972 | Ducksbury et al. | 204/195 G |
| 3,700,577 | 10/1972 | Grauer | 204/195 F |
| 3,756,936 | 9/1973 | Neuwelt | 204/195 F |

FOREIGN PATENTS OR APPLICATIONS

| | | | |
|---|---|---|---|
| 729,575 | 5/1955 | United Kingdom | 204/195 F |

*Primary Examiner*—T. Tung

[57] ABSTRACT

An electrochemical system includes a first electrode for sensing a fluid sample to be analyzed and a reference electrode. The reference electrode is disposed in electrolyte and a membrane separates the electrolyte from the fluid sample. The membrane has a multiplicity of parallel passages, the width of each passage being less than one-half micron, such that the passages provide a multiplicity of similar ionic junctions between the electrolyte and the fluid sample.

6 Claims, 3 Drawing Figures

ELECTROCHEMICAL STRUCTURE

SUMMARY OF INVENTION

This invention relates to electrochemical electrode structures and more particularly to a leak structure for a liquid junction in an electrochemical electrode structure such as is used as a reference electrode for ion potential measurements in solutions.

In electrochemical measurements, two electrodes, a measuring electrode and a reference electrode, are commonly employed in an arrangement whereby the potential difference between the two electrodes is a function of the concentration of a specific ion in the solution of interest. Such an electrochemical electrode structure is used for measuring hydrogen ion concentration in solutions, for example. A particular use of such an electrode system is for pH blood measurements.

A typical measurement of pH of blood involves the measurement of the sum of a series of potentials: the potential of a silver silver chloride reference electrode within the pH electrode chamber; the potentials on the inside and outside surfaces of a pH sensitive glass membrane, the blood to be measured being on the inside surfaces of the glass membrane; the junction potential occuring at the interface of the blood and a reference electrolyte solution (usually saturated KCl); and the potential of a calomel reference electrode. The potential generated on the blood side of the pH sensitive glass membrane ($E_{pH}$) and the liquid junction potential ($E_J$) are dependent on the composition of the blood sample. $E_{pH}$ is related to the acidity or pH of the blood; and $E_J$ is related to differences in ionic mobilities in the blood and the reference electrolyte solution (due either to dissimilarity in composition and/or concentration), the three dimensional geometry of the blood-electrolyte interface, and the presence of colloidal particles in the blood.

A major source of difficulty in making the blood pH measurements resides not in the pH electrode itself but at the interface (reference junction) between the blood and reference electrolyte solution. Reference junctions can be divided into two very general categories: open junctions and restricted flow junctions. The open junction can be considered a single orifice of macroscopic dimensions, while the restricted flow junction can be considered as a collection of microscopic open junctions, the flow of the reference solution being restricted by material having microscopic channels or pores. The ceramic plug is an example of this type of junction through which a very low flow of the reference solution occurs continually. The restricted flow type junction offer advantages over the open type as the reference solution flow is controlled and valving and pressure differential requirements are simplified or eliminated. However, restricted flow junctions heretofore available have not been satisfactory for blood pH measurement. For example, the ceramic plug does not function reliably for any reasonable period of time in blood; cellophane can give rise to undesirable osmotic effects; and woven and matted fiber configurations do not have well-defined mechanical characteristics.

It is an object of this invention to provide a novel and improved leak structure which is durable, reliable, simple and inexpensive to manufacture, and provides a reproducible electrical potential.

Another object of the invention is to provide a novel and improved leak structure which is particularly adapted for use in electrochemical measurements of blood.

In accordance with the invention, an electrochemical electrode structure includes a first chamber adapted to contain electrolyte and a second chamber adapted to contain the material to be analyzed. Each chamber has an opening therein and the openings are in juxtaposed relation to one another. A flow control member that is at least coextensive with and sealed to the openings provides a controlled liquid flow path for establishing an ionic junction between the electrolyte and a sample material to be measured by the electrode structure. The flow control member has a smooth surface exposed to the sample and a multiplicity of substantially parallel passages of equal length that extend through the member. In preferred embodiments, the flow control member is a thin membrane of hydrophillic material with a passage density of more than $10^8$ per square centimeter. The diameter of each passage is less than 0.5 micron, and the surface smoothness (maximum peak to valley distance) is less than about 1 micron. Due to the pore density and the thinness of the membrane, the electrical resistance of the junction in use is less than one hundred ohms, low as compared with ceramic plugs and asbestos wicks.

In a specific embodiment, the second chamber defines a sample passage that has inlet and outlet arms disposed at an acute angle to one another and an aperture of about one millimeter in diameter is provided in one wall at the junction of the arms. The flow control member is secured over the passage aperture with a sheet of impervious material that has a hole about one millimeter in diameter formed in it, the hole being aligned with the passage aperture; and a port from the reference electrolyte reservoir contacts the securing sheet so that the reference electrolyte contacts the flow control member through the hole in the securing sheet.

A particularly useful flow control member is made from a ten-micron thick polycarbonate sheet having 0.1 micron diameter passages formed by subjecting the polycarbonate material to ion bombardment to form aligned tracks of damaged polymeric material, the ion tracks being etched to remove the damaged polycarbonate material as described in U.S. Pat. No. 3,677,844. With a 25 centimeter head of potassium chloride, the flow rate through this member is about 0.3 microliter per minute per square millimeter.

In a particular embodiment, the lead junction structure is used with an electrochemical electrode system that includes a pH electrode system and a reference electrode system. The pH electrode system includes a sample flow path, at least a portion of which is defined by a pH sensitive member, that is constructed to allow the sample to be analyzed to flow past the leak junction member. Vacuum applied to the sample flow path induces a sample to be analyzed into the flow path. Disposed on the other side of the pH sensitive member from the sample is a sensing electrode. The reference electrode system includes a reference electrode disposed in electrolyte that is in communication with the leak junction member on the opposite side from the sample. A measuring circuit senses the sum of the potentials at the sensing and reference electrodes and at the pH sensitive and leak junction members to provide an indication of the pH of the sample. The restricted junction arrangement of the electrochemical electrode system functions to reproducibly provide blood junction potentials of accuracy comparable with those obtained with open junction types of systems. The system is operable with a head of less than two centimeters which produces a flow rate of about 0.02 microliter per minute per square millimeter and has excellent stability and response time characteristics. The invention enables minute samples of precious fluids to be analyzed and provides reliable measurements in an automated flow-through system which can be subjected to temperature and pressure cycles such as are encountered in the automated handling of fluid.

Other objects, features and advantages will be seen as the following description of a particular embodiment progresses, in conjunction with the drawings, in which.

DESCRIPTION OF PARTICULAR EMBODIMENT

Figure 1:
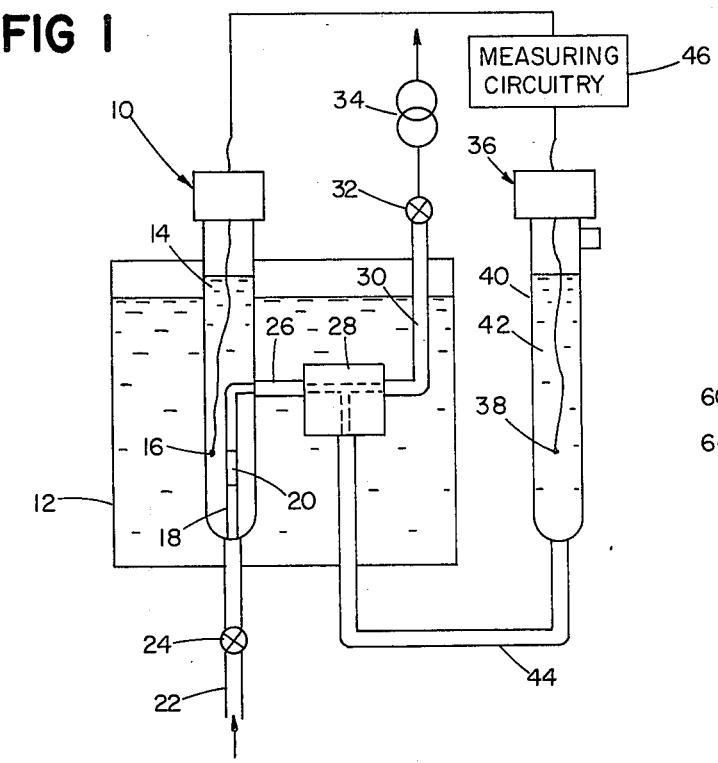
FIG. 1 is a diagrammatic view of an electrochemical electrode system in accordance with the invention.

In FIG. 1 there is shown a pH electrode 10 in a water bath 12. The pH electrode 10 includes a chamber 14 having a silver silver chloride sensing electrode 16 in it and a glass tube 18, one section 20 of which is composed of pH sensitive glass. The inlet end of tube 18 is connected to sample inlet 22 with inlet flow being controlled by valve 24 and its outlet and is connected by conduit 26 to liquid junction structure 28. The sample flow path from liquid junction structure 28 is through tube 30 controlled by valve 32, under the influence of vacuum pump diagrammatically indicated at 34 to waste.

A cooperating reference electrode 36 includes an Hg/Hg$_2$Cl$_2$ (calomel) electrode 38 disposed in a chamber 40 filled with a KCl electrolyte 42. Tube 44 connects the electrolyte to the liquid junction structure 28. Electrodes 16 and 36 are connected to measuring circuitry 46 which provides an indication of the sum of the potentials of electrodes 16 and 36, section 20 and leak junction 28.

Figure 2:
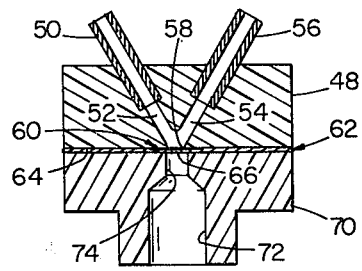
FIG. 2 is a sectional view of a liquid junction structure employed in the embodiment shown in FIG. 1.

Additional details of the liquid junction structure may be seen with reference to FIG. 2. That structure includes a blood flow passage member 48 with inlet flow tube 26 connected to coupling 50 that in turn is connected to 0.75 millimeter diameter passage 52. Exit passage 54 as of the same diameter as passage 52 is connected to coupling 56 which in turn is connected to tube 30. Passages 52 and 54 are disposed at an angle of 60° to one another. At the junction of passages 52, 54, an external port 58 about 1 millimeter in diameter is formed. Disposed over port 58 is a disc 60 of polycarbonate material which is secured by a strip of polytetrafluoroethylene (Teflon) adhesive tape 62. Disc 60 is secured in place against surface 64 by tape 62 which has a hole 66 about 1 millimeter in diameter that is aligned with port 58. Clamped against tape 62 and member 48 is reference electrolyte coupling member 70 that includes passage 72 which is connected to conduit 44.

Figure 3:
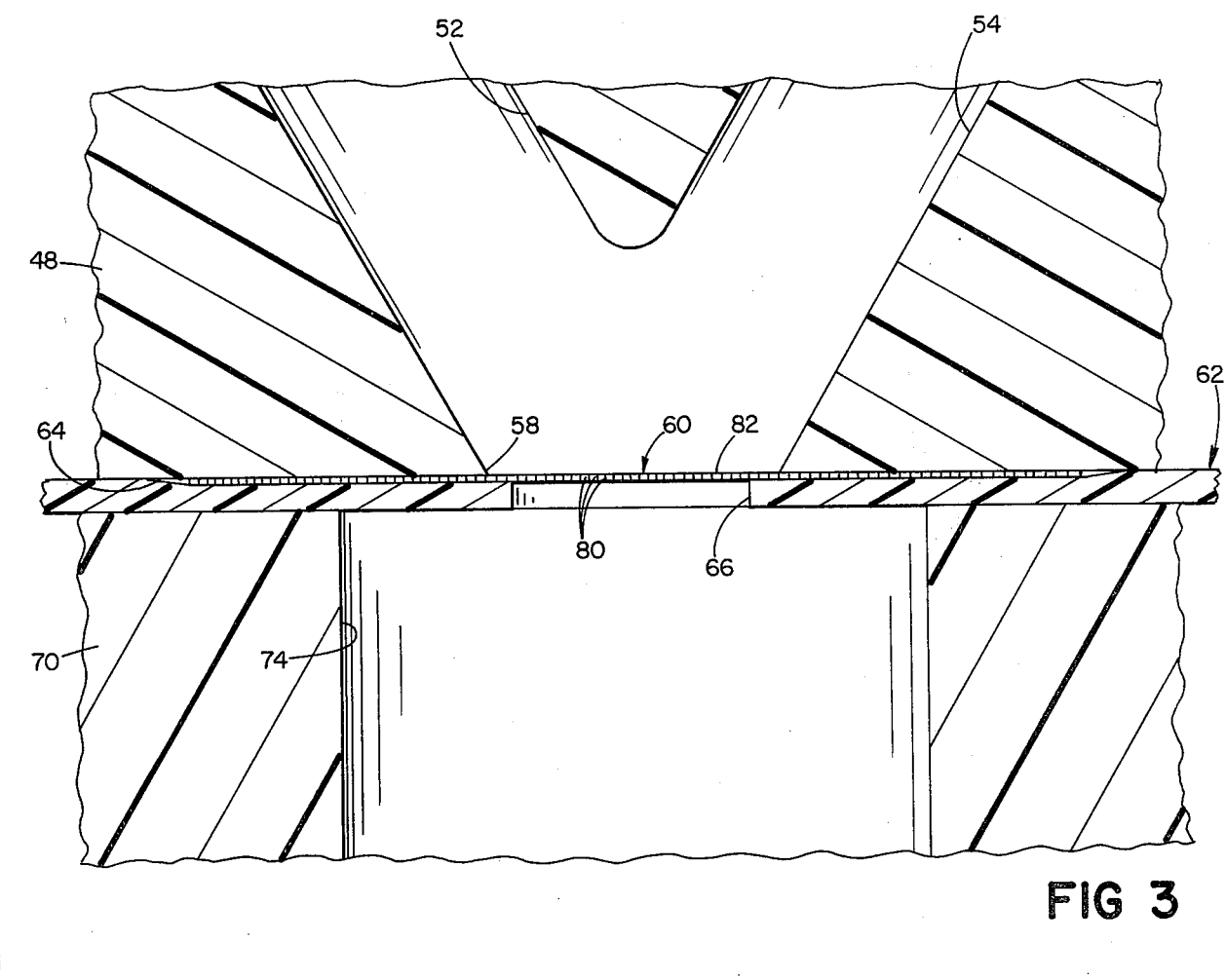
FIG. 3 is an enlarged view of the liquid junction structure shown in FIG. 2.

A further understanding may be had with reference to the enlarged view of FIG. 3. As described above, the blood flow path includes 0.75 millimeter diameter entrance passage or arm 52 which is connected to exit passage 54 that also has a diameter of 0.75 millimeter. The axes of passages 52 and 54 are disposed at an angle of 60° to each other and a port 58 of about 1 millimeter in diameter is formed adjacent the intersection of passages 52 and 54. The plane of port 58 forms an obtuse angle with the adjacent surface of each passage 52, 54. Polycarbonate disc 60 is about 10 microns in thickness and has a multiplicity of parallel passages or pores 80, each about 0.1 micron in diameter, the pore density being about 3 × 10$^8$ per square centimeter. Passages 80 thus provide a multiplicity of parallel, elongated, minute ionic junction passages of uniform geometry. The polytetrafluoroethylene tape 62 that seals disc 60 against surface 64 has an aperture 66 about 1 millimeter in diameter which is aligned with port 58. Clamped against membrane tape 62 is electrolyte coupling member 70 that has a two millimeter diameter port 74 to which the potassium chloride electrolyte in chamber 40 is supplied by conduit 44.

Tape 62 has adhesive on one surface which facilitates the handling of the disc membrane 60 and holds the membrane in position on the blood flow passage member 48 prior to clamping by the electrolyte coupling member 70. The adhesive tape seals off all the pores 80 in the membrane 60 except for those above the hole 66 so that the active membrane area is defined with precision. The surface 82 of membrane 60 in contact with the blood flowing through passages 52, 54 is very smooth, the maximum peak to valley distance being less than about 0.5 micron; the polycarbonate material has a water contact angle of 78° and is therefore hydrophillic; and the material is free of bacteriostatic and bacteriosidal additives. The junction system provides a flow rate of about 0.01 microliter per minute per square millimeter per centimeter head of KCl; and has an electrical resistance of about two ohms.

In operation, a sample of blood is induced into the tube 18 and liquid junction structure 28 under the influence of vacuum pump 34 as controlled by valves 24 and 32. A measurement of the potentials by circuitry 46 provides an indication of the pH value of the blood sample. After the measurement is completed, the blood sample is removed from the system by vacuum pump 34 and the flow passage is cleaned by passing a flushing solution serially through tubes 18, 26, 50, 52, 54, 56 and 30. The leak junction structure 28 provides a smooth flow of the sample and cleaning solution past orifice 58 such that surface 82 of the membrane can be readily cleaned. pH readings are obtained rapidly in about 5–20 seconds) and the resulting readings are in excellent agreement with readings obtained using the same pH and reference electrodes in commercially available equipment having reference junctions of the open type. Repeatability of the pH readings of the above described system is in the range of 0.002–0.003 pH units.

While a particular embodiment of the invention has been shown and described, various modifications thereof will be apparent to those skilled in the art, and therefore it is not intended that the invention be limited to the disclosed embodiment or to details thereof and departures may be made therefrom within the spirit and scope of the invention as defined in the claims.

What is claimed is:

1. A restricted flow leak junction structure for use in an electrochemical electrode system comprising a first structure defining a sample chamber for material to be analyzed, said sample chamber having an opening therein and including a sample flow path, a portion of said sample flow path including inlet and outlet arms, said arms being disposed at an angle to one another, and the opening in said sample chamber being adjacent the junction of said arms, a second structure defining a second chamber adapted to contain electrolyte, said second chamber having an opening therein, and a leak junction member having a multiplicity of restricted flow passages therethrough, said member being disposed between said openings in said first and second structures such that said restricted flow passages provide a multiplicity of ionic junctions between electrolyte in said second chamber and material in said sample chamber to establish a stable junction potential between said electrolyte and material in said sample chamber, a surface of each said arm being contiguous with and disposed at an obtuse angle to a surface of said leak junction member such that cleaning of said sample flow path is facilitated by the dynamic flow of sample material over said surface of said leak junction member and the contiguous surfaces of said arms.

2. The structure as claimed in claim 1 wherein said first and second structures are of electrically non-conductive material and said leak junction member is of polymeric material.

3. The structure as claimed in claim 1 wherein said leak junction member is a thin membrane that has a smooth surface exposed to said sample flow path, said passages are substantially equal in length, and the density of said passages in said leak junction member is at least about $10^8$ per square centimeter.

4. The structure as claimed in claim 3 wherein the passage dimensions of said leak junction member are such that the flow rate of electrolyte from said second chamber to said first chamber through said passages is greater than zero but less than 0.1 microliter per minute per square millimeter of leak junction member area per centimeter head of electrolyte.

5. The structure as claimed in claim 4 wherein the electrical resistance of said leak junction member is less than one hundred ohms.

6. The structure as claimed in claim 5 and further including a sheet support member having a hole therein, said leak junction member being secured to said sheet support member and said leak junction member and said sheet support member being positioned between said first and second structures so that said hole is in alignment with said openings in said first and second members.

* * * * *

UNITED STATES PATENT AND TRADEMARK OFFICE
CERTIFICATE OF CORRECTION

PATENT NO. : 3,915,829
DATED : October 28, 1975
INVENTOR(S) : William M. Krebs

It is certified that error appears in the above-identified patent and that said Letters Patent are hereby corrected as shown below:

Under "References Cited", insert the following:

--3,725,237  4/73  Matsuyama et al.......204/195L--;

Column 2, line 50, "lead" should be --leak--;

Column 3, line 31, "and" should be --end--;

Column 4, line 49, add a parenthesis before "in".

*Signed and Sealed this*

*seventeenth* Day of *February 1976*

[SEAL]

*Attest:*

RUTH C. MASON
*Attesting Officer*

C. MARSHALL DANN
*Commissioner of Patents and Trademarks*